United States Patent [19]

Inoue et al.

[11] Patent Number: 4,584,916
[45] Date of Patent: Apr. 29, 1986

[54] LEAD FACE MACHINING APPARATUS

[75] Inventors: Mamoru Inoue; Morimichi Hasegawa; Shozi Hara, all of Hirakata; Kiyokazu Imanishi, Osaka; Yoshiyuki Kubota, Hirakata; Haruhiko Kitagawa, Okayama, all of Japan

[73] Assignee: Matsushita Electric Industrial Co., Ltd., Osaka, Japan

[21] Appl. No.: 400,264

[22] Filed: Jul. 21, 1982

[30] Foreign Application Priority Data

Jul. 23, 1981 [JP] Japan .................. 56-115754

[51] Int. Cl.$^4$ .............. B23B 3/28; B23B 19/02; B23B 21/00; F16C 32/06
[52] U.S. Cl. .............................. 82/19; 82/30; 308/3 A; 308/5 R; 308/DIG. 13; 409/904
[58] Field of Search ............ 82/19, 30; 308/3 A, 308/5 R, DIG. 1, DIG. 13; 409/904; 464/83

[56] References Cited

U.S. PATENT DOCUMENTS

| | | |
|---|---|---|
| 1,179,361 | 4/1916 | Sparks .................. 82/19 |
| 1,397,530 | 11/1921 | Lubeck .................. 464/83 |
| 3,358,520 | 12/1967 | Heydlauf .................. 464/83 |
| 3,438,288 | 4/1969 | Kaiser .................. 82/30 |
| 3,533,316 | 10/1970 | Porath .................. 82/30 |
| 3,603,652 | 9/1971 | Youden .................. 83/30 |
| 3,675,517 | 7/1972 | Tadayoshi .................. 82/21 B |
| 3,736,818 | 6/1973 | Ennis .................. 83/30 |
| 3,844,186 | 10/1974 | Youden et al. .................. 82/30 |
| 4,083,272 | 4/1978 | Miller .................. 82/12 |
| 4,143,564 | 3/1979 | DeBiasse .................. 82/19 |
| 4,272,216 | 6/1981 | Osburn .................. 409/904 |
| 4,368,930 | 1/1983 | Duchaine .................. 308/5 R |

Primary Examiner—Francis S. Husar
Assistant Examiner—Jerry Kearns
Attorney, Agent, or Firm—Birch, Stewart, Kolasch & Birch

[57] ABSTRACT

A lead face machining apparatus for machining a lead face on a cylindrical workpiece. The apparatus includes a spindle unit having the workpiece rotatably mounted on it, an end cam provided rotatably together with the spindle, a first slide table and a second slide table such that each of the spindle unit, first slide table and second slide table has a static pressure fluid bearing structure. The apparatus is further provided with means for supplying fluid to the static pressure fluid bearings in common, whereby the workpiece is least subjected to vibration produced through contact of the end cam by a lead machining unit for machining the workpiece.

4 Claims, 22 Drawing Figures

LEAD FACE MACHINING APPARATUS

BACKGROUND OF THE INVENTION

The present invention generally relates to a machining apparatus and more particularly, to a lead face machining apparatus for accurately machining a lead face and a cylindrical surface of a cylindrical work.

For components each having a lead face formed on a cylindrical surface thereof as generally shown in FIG. 1, there is recently a sharply increasing demand for recording/reproducing cylinders for use in cassette video recorders for domestic use (helical type video tape recorders) in the field of electric industry. The cylinder comprises a fixed cylinder 1 having a cam curve shown in a development view of FIG. 2, and a rotational cylinder 2 (accommodating a magnetic head therein) rotatably provided coaxially with the fixed cylinder 1. A magnetic tape 3 is provided so as to extend over the fixed cylinder 1 and rotational cylinder 2, and is arranged to run slowly along a lead face 4 of the fixed cylinder 1. The rotational cylinder 2 is rotated at a speed of a few m/sec. such that scanning is performed at the relative speed by the magnetic head, whereby video signals are recorded in magnetic tracks $A_1$ each having a width of approximate 20 $\mu$m. On the other hand, when pictures are to be reproduced on a screen of a television receiver, the magnetic head is required to rescan the same magnetic tracks as those scanned during recording with an error of within 2 to 3 $\mu$m or less. Meanwhile, since the magnetic tape is made of a soft polymer tape having a magnetic material coated on opposite surfaces thereof, the lead face 4 and cylindrical surface 5 of the fixed cylinder 1, both acting as guideways for the magnetic tape 3 are required to be smooth and to be made of non-magnetic material and therefore, are generally made of aluminum alloy. Accordingly, in order to obtain an accuracy of 2 to 3 $\mu$m and a smooth machined surface, the fixed cylinder 1 has been manufactured by cutting operations.

Conventionally, in order to machine workpieces having such a lead face and a cylindrical surface as described above, it has been a general practice that general purpose machines such as a lathe, a milling machine, etc. are employed or special purpose machines such as a cam forming machine, etc. are utilized. However, these known methods have been disadvantageous in that it is difficult to machine the workpieces at the above-described accuracy efficiently.

Furthermore, although, as disclosed in Japanese Utility Model Publication No. 23789/1980 (Jikkosho No. 55-23789), there has been proposed a method in which a cylindrical surface and a lead face are machined by a special purpose machine in accordance with a lead cam separately provided, this prior art method has such disadvantages that the special purpose machine becomes complicated in structure and therefore, is liable to vibrate.

SUMMARY OF THE INVENTION

Accordingly, an essential object of the present invention is to provide an improved lead face machining apparatus for machining a lead face on a workpiece at high efficiency and with remarkable accuracy, with substantial elimination of the disadvantages inherent in conventional lead face machining apparatuses of this kind.

Another important object of the present invention is to provide an improved lead face machining apparatus of the above described type which is simple in structure and highly reliable in actual use.

In accomplishing these and other objects according to one preferred embodiment of the present invention, there is provided an improved lead face machining apparatus comprising:

a spindle unit which has a workpiece rotatably mounted thereon and includes a housing and a spindle rotatably supported by said housing;

said housing having a static pressure fluid bearing formed between said spindle and said housing;

an end cam which is provided rotatably together with said spindle;

a first slide table which includes a first guide member extending in an axial direction of said spindle unit, and a first table provided slidably along said first guide member;

said first table having a first passage for introducing fluid into between said first guide member and said first table and a first return passage for returning the fluid to a pressure generating unit so as to constitute a first static pressure fluid bearing between said first table and said first guide member;

a second slide table which includes a second guide member extending substantially at right angles to the axial direction of said spindle unit, and a second table provided slidably along said second guide member;

said second table having a second passage for introducing the fluid into between said second guide member and said second table, and a second return passage for returning the fluid to said pressure generating unit so as to constitute a second static pressure fluid bearing between said second table and said second guide member;

said second slide table being provided on said first slide table or alternatively having said first slide table placed thereon;

a lead machining unit which is placed on either one of said second slide table and said first slide table so as to be brought into contact with said end cam and includes a cutting tool;

said cutting tool being caused to slide in the axial direction of said spindle unit upon rotation of said end cam so as to machine said workpiece mounted on said spindle unit; and a fluid supplying means for supplying the fluid to said static pressure fluid bearing, said first static pressure fluid bearing and said second static pressure fluid bearing in common.

In accordance with the present invention, since a lead cam having the same stroke as that of a required lead curve is provided on the spindle unit for rotating the work so that the cutting tool may be reciprocated in accordance with the lead cam, the lead face can be machined on the workpiece remarkably efficiently and accurately.

BRIEF DESCRIPTION OF THE DRAWINGS

These and other objects and features of the present invention will become apparent from the following description taken in conjunction with the preferred embodiment thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 3:
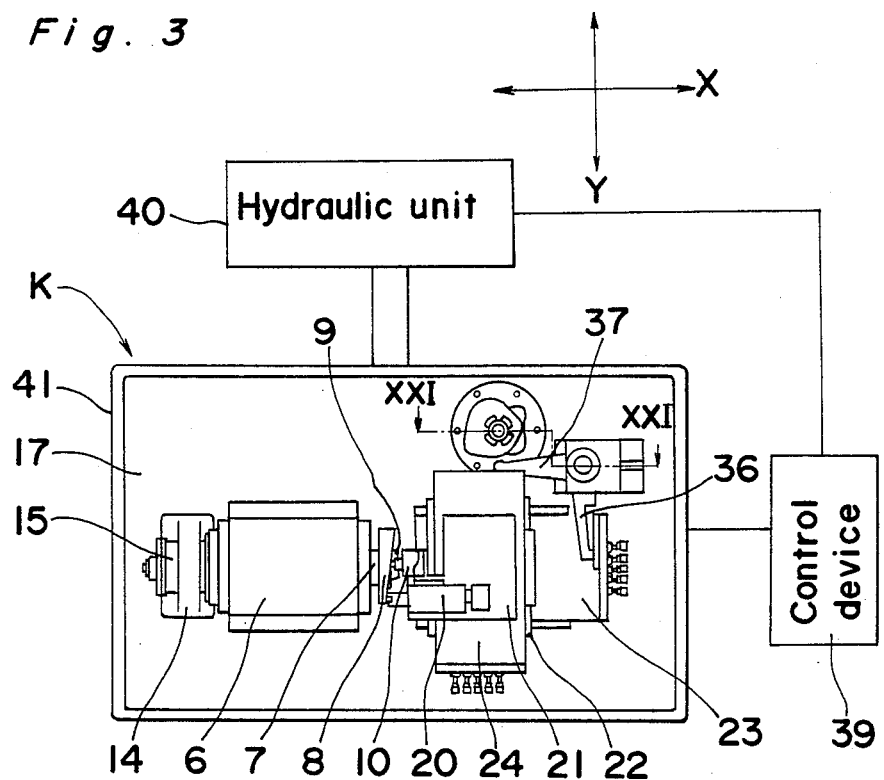
FIG. 3 is a top plan view of a lead face machining apparatus according to one preferred embodiment of the present invention.
Figure 4:
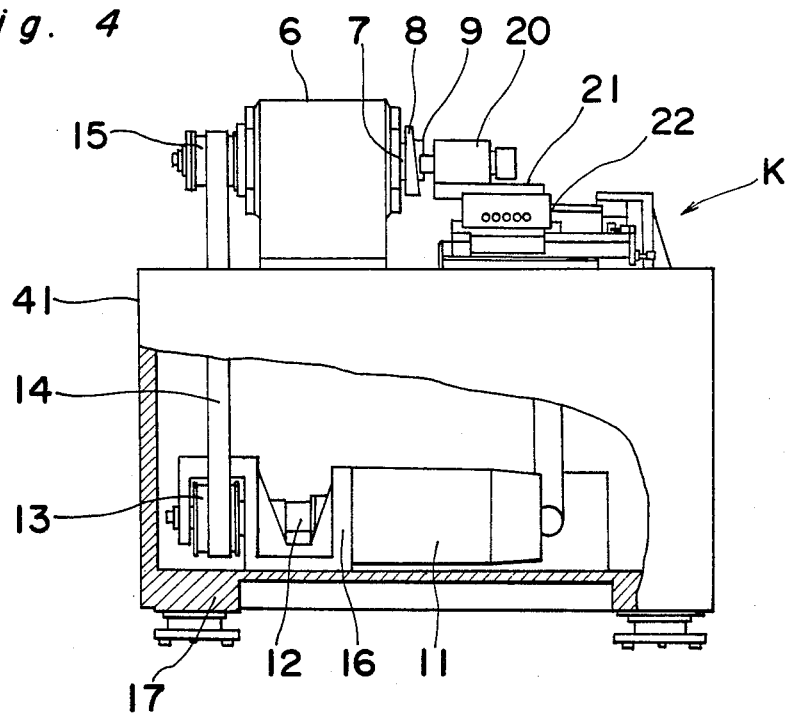
FIG. 4 is a front elevational view partly in section of the lead face machining apparatus of FIG. 3.
Figure 5:
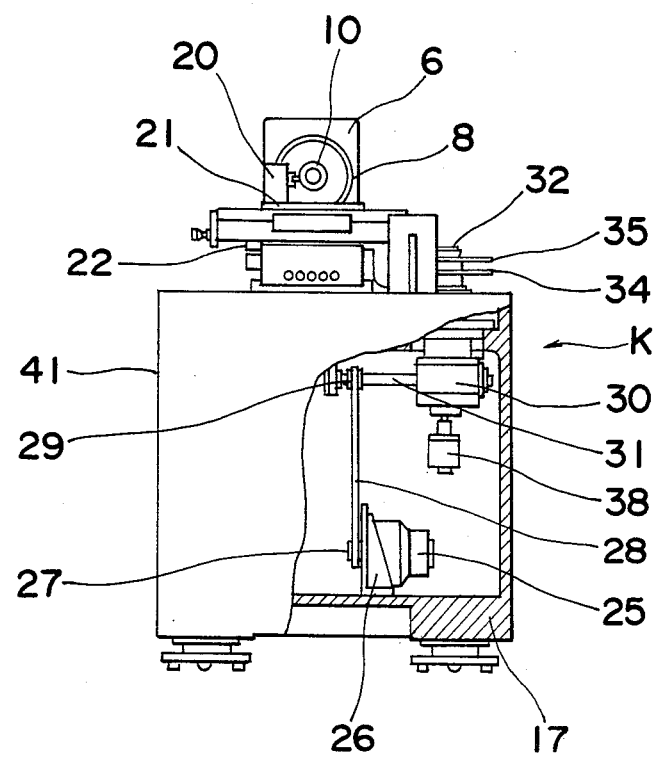
FIG. 5 is a right side elevational view partly in section of the lead face machining apparatus of FIG. 3.

Referring now to the drawings, there is shown in FIGS. 3 to 5, a lead face machining apparatus K according to one preferred embodiment of the present invention. The lead face machining apparatus K includes a spindle unit 6, a lead cam 8, an X-axis slide table 23, a Y-axis slide table 24 and a lead machining unit 20. It is to be noted here that the X-axis and the Y-axis of the lead face machining apparatus K are, respectively, directed in the directions of the arrows X and Y in FIG. 3, hereinbelow. The apparatus K is provided with a hydraulic unit 40 and a control device 39 as accessories. The lead cam 8 as an end cam and a chuck 9 are mounted on one end of a spindle 7 of the spindle unit 6 and a workpiece or a work 10 is gripped by the chuck 9. The spindle 7 is rotated by a pulley 15 through a flat belt 14 upon rotation of a pulley 13 which is connected with a spindle motor 11 by a coupling 12.

Figure 9:
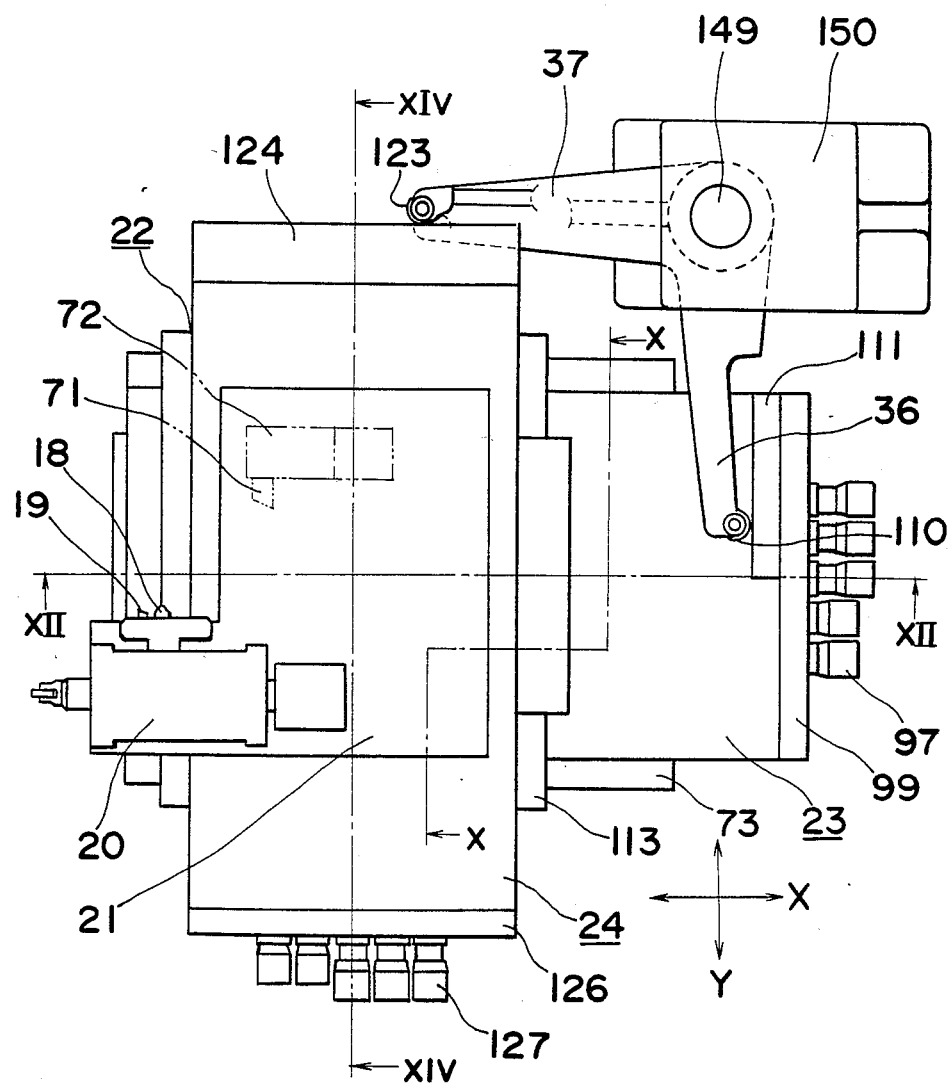
FIG. 9 is an enlarged top plan view of a slide table unit employed in the lead face machining apparatus of FIG. 3.

Meanwhile, as shown in FIG. 9, cutting tools 18 and 19 are secured to the lead machining unit 20 which is mounted on a slide table unit 22 through a tool plate 21. The slide table unit 22 is composed of the X-axis slide table 23 and Y-axis slide table 24.

As shown in FIG. 5, a cam shaft motor 25 for driving the slide table unit 22 is mounted on a frame 17 through a bracket 26. It is so arranged that output of the cam shaft motor 25 is transmitted to an input shaft 31 of a reduction gear 30 through a pulley 27, a timing belt 28 and a pulley 29. Since a cam shaft 32 as an output shaft of the reduction gear 30 is rotated upon rotation of the input shaft 31, an X-axis cam 34 and a Y-axis cam 35 attached to the cam shaft 32 are rotated so as to drive the X-axis slide table 23 and Y-axis slide table 24 through a lever 36 and a lever 37, respectively (FIG. 9). Furthermore, an encoder 38 is connected with the cam shaft 32 so as to transmit to the control device 39 pulse signals which detect rotational positions of the cam shaft 32.

Referring back to FIG. 3, the hydraulic unit 40 acting as a hydraulic pressure generating device is provided for supplying working fluid to static pressure fluid bearing portions of the spindle unit 6 and of the slide table unit 22 and the lead machining unit 20 while the control device 39 is arranged to control the hydraulic unit 40 and a lead face machining apparatus proper 41 on the basis of signals from the encoder 38.

Thus, arrangements of the lead face machining apparatus K of the present invention have been described briefly. Hereinbelow, each part of the lead face machining apparatus K will be described in detail.

Figure 6:
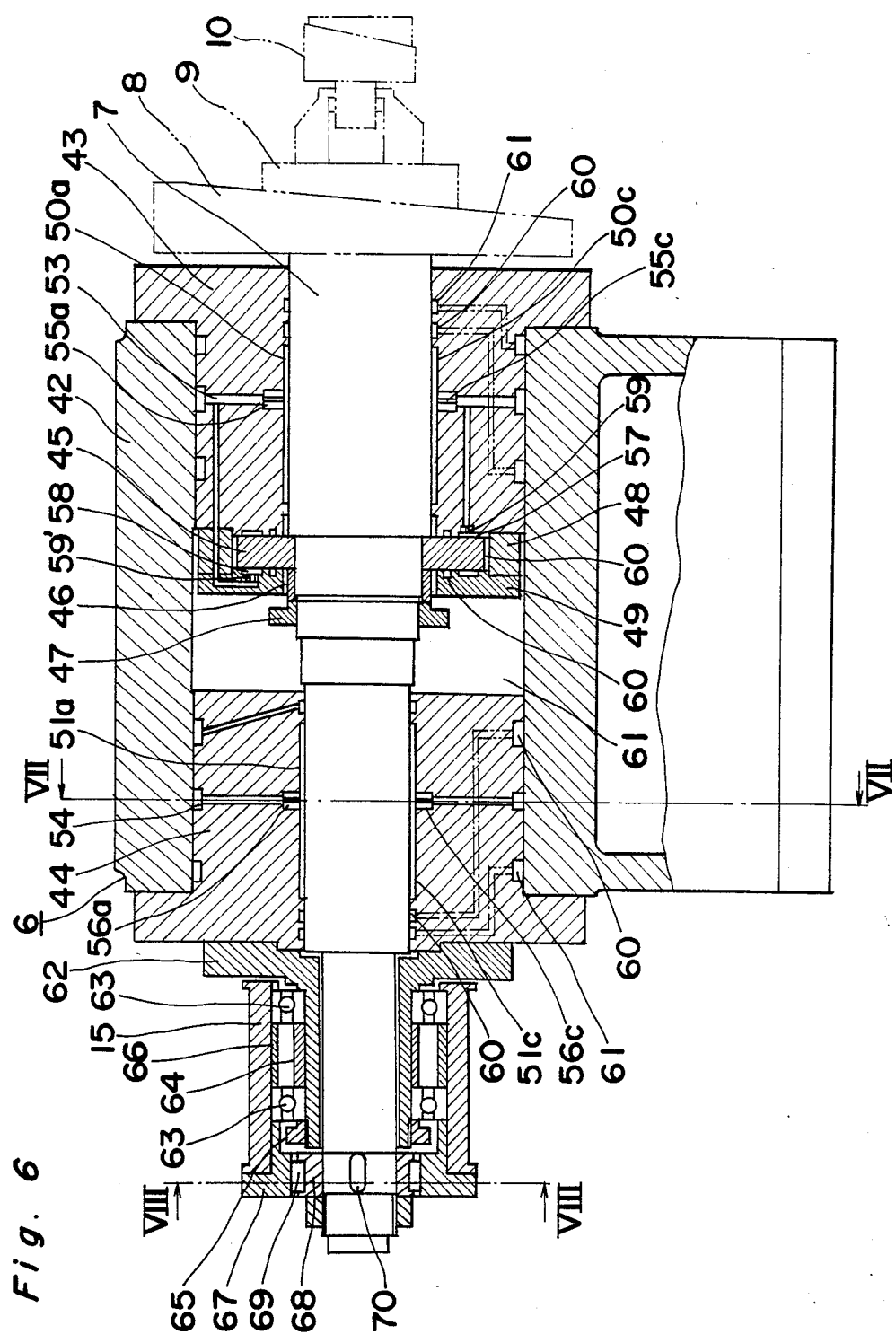
FIG. 6 is an enlarged cross-sectional view of a spindle unit employed in the lead face machining apparatus of FIG. 3.
Figure 7:
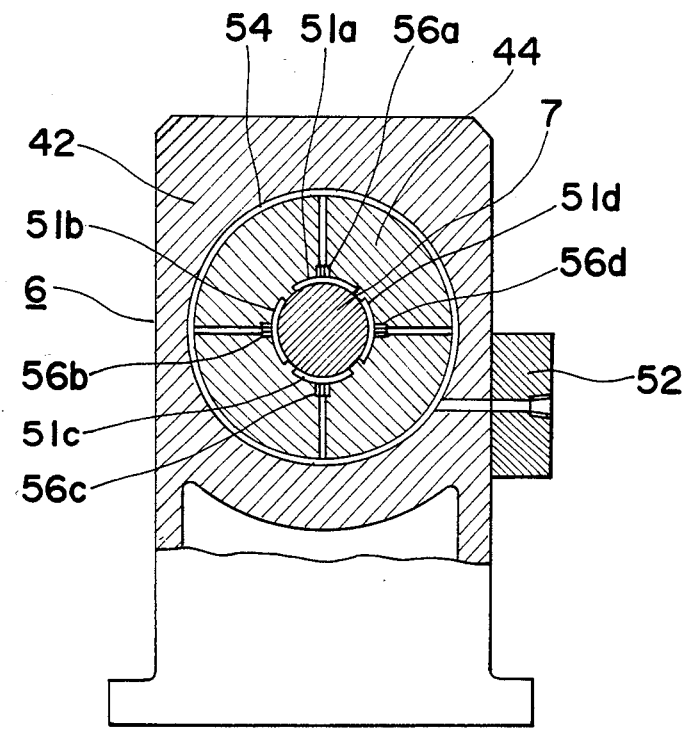
FIG. 7 is a cross-sectional view taken along the line VII—VII in FIG. 6.

Referring to FIGS. 6 and 7, the spindle unit 6 includes the spindle 7, a housing 42, a radial/thrust bush 43, a radial bush 44, a flange 45 and a bracket 62. The radial/thrust bush 43 and radial bush 44 are press fitted into the housing 42 and the spindle 7 is further fitted into the radial/thrust bush 43 and radial bush 44 with a clearance of approximate 10 μm. The flange 45 for supporting a thrust load is secured to the spindle 7 by a nut 47 through a collar 46. A thrust bush 49 is fixed to the radial/thrust bush 43 through a spacer 48 such that the flange 45 is interposed between the thrust bush 49 and the radial/thrust bush 43. It should be noted that the flange 45 is approximately 10 μm spaced from the thrust bush 49 and radial/thrust bush 43.

As best shown in FIG. 7, the radial bush 44 has pockets 51a, 51b, 51c and 51d which are formed in a circumferential direction thereof on its bore surface mating with the spindle 7 so as to be disposed at an equal interval and extend over a rather long distance in an axial direction thereof within the radial bush 44. Further, the pockets 51a, 51b, 51c and 51d are provided with restrictors 56a, 56b, 56c and 56d, respectively. The radial bush 44 has a first passage 54 which includes a circular groove formed on an outer periphery thereof and radial passages extending, respectively, in radial directions at an interval of 90° from the restrictors 56a, 56b, 56c and 56d so that the circular groove may be communicated with the radial passages, whereby hydraulic pressure of the hydraulic unit 40 is transmitted from a manifold 52 to the pockets 51a, 51b, 51c and 51d through the first passage 54 and through the restrictors 56a, 56b, 56c and 56d, respectively. In the same manner as described above, the radial/thrust bush 43 has pockets 50a, 50b (not shown), 50c and 50d (not shown) which are provided with restrictors 55a, 55b (not shown), 55c and 55d (not shown), respectively. Further, the radial/thrust bush 43 has a first passage 53 and thus, the hydraulic pressure of the hydraulic unit 40 is transmitted from the manifold 52 to the pockets 50a, 50b, 50c and 50d through the first passage 53 and through the restrictors 55a, 55b, 55c and 55d, respectively.

Meanwhile, the radial/thrust bush 43 has a pocket 57 which is formed on one surface thereof confronting the flange 45 and is provided with a restrictor 59 communicated with the first passage 53. Likewise, the thrust bush 49 has a pocket 58 which is formed on one surface thereof confronting the flange 45 and is provided with a restrictor 59' communicated with the first passage 53. As in the case of the pockets 50a to 50d, the hydraulic pressure of the hydraulic unit 40 is transmitted from the first passage 53 to the pockets 57 and 58 through the restrictors 59 and 59', respectively.

It is to be noted that working fluid which has leaked out of the pockets 50a to 50d, 51a to 51d, 57 and 58 through clearances between the spindle 7 and the radial/thrust bush 43, between the spindle 7 and the radial bush 44, between the flange 45 and the radial/thrust bush 43, and between the flange 45 and the thrust bush 49 is collected into the hydraulic unit 40 through second passages 60. The second passages 60 are formed on the bore surface of the radial/thrust bush 43 outwardly in the axial direction thereof with respect to the pockets 50a to 50d, on the bore surface of the radial bush 44 outwardly in the axial direction thereof with respect to the pockets 51a to 51d, and on the one surface of the thrust bush 49 confronting the flange 45, inwardly in the radial direction thereof with respect to the pocket 58. It should be noted that a part of the second passages 60 is abbreviated in FIG. 6. In FIG. 6, the working fluid which has further leaked out of the second passages 60 is collected into the hydraulic unit 40 through third passages 61 for drainage. The third passages 61 are formed on the bore surface of the radial/thrust bush 43 outwardly in the axial direction thereof with respect to the second passage 60 of the radial/thrust bush 43 and on the bore surface of the radial bush 44 outwardly in the axial direction thereof with respect to the second passage 60 of the radial bush 44.

Figure 8:
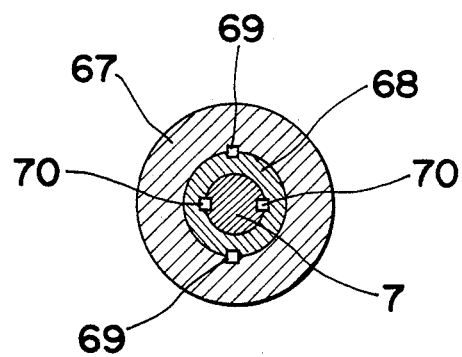
FIG. 8 is a cross-sectional view taken along the line VIII—VIII in FIG. 6.

As described above, the spindle 7 is supported by a static pressure fluid bearing structure composed of the radial/thrust bush 43, radial bush 44 and thrust bush 49. The bracket 62 is secured to the radial bush 44 while two bearings 63 are mounted in the bracket 62 by a collar 64 and a nut 65 with the collar 64 being interposed between the bearings 63. The pulley 15 is rotatably mounted on the bracket 62 by a collar 66 and a cover 67 through the bearings 63. Meanwhile, a ring 68 disposed between the cover 67 and the spindle 7 is coupled with the cover 67 by two keys 69 made of elastic material and is also coupled with the spindle 7 by two keys 70. As shown in FIG. 8, the ring 68 has key ways for the keys 69, which are formed on an outer periphery thereof so as to be spaced 180° from each other. Similarly, the ring 68 has key ways for the keys 70, which are formed on a bore surface thereof so as to be spaced 180° from each other with the key ways for the keys 69 being spaced 90° from the key ways for the keys 70.

In the above-described arrangements of the lead face machining apparatus K, when a rotational force is transmitted to the pulley 15 by the flat belt 14 (FIG. 4), the rotational force is further transmitted to the spindle 7 through the keys 69, ring 68 and keys 70, so that the lead cam 8, chuck 9 and work 10 each mounted on the spindle 7 are rotated. Since the spindle 7 is supported by the static pressure fluid bearing structure and the keys 69 are made of elastic material as described above, the lead cam 8 and work 10 are rotated with a minimum run-out of the spindle 7.

Hereinbelow, the slide table unit 22 will be described with reference to FIGS. 3 to 5 and 9 to 15.

As shown in FIG. 9, the cutting tools 18 and 19 for cutting, respectively, the cylindrical surface 5 and lead face 4 of the component (FIG. 1) are fixed to the lead machining unit 20 which is secured to the tool plate 21 provided on the Y-axis slide table 24. Meanwhile, the Y-axis slide table 24 is mounted on the X-axis slide table 23. Furthermore, as shown in imaginary lines in FIG. 9, a cutting tool 71 for cutting a cylindrical surface 33 of the component (FIG. 1) can be provid.de on the tool plate 21 through a tool holder 72.

Figure 10:
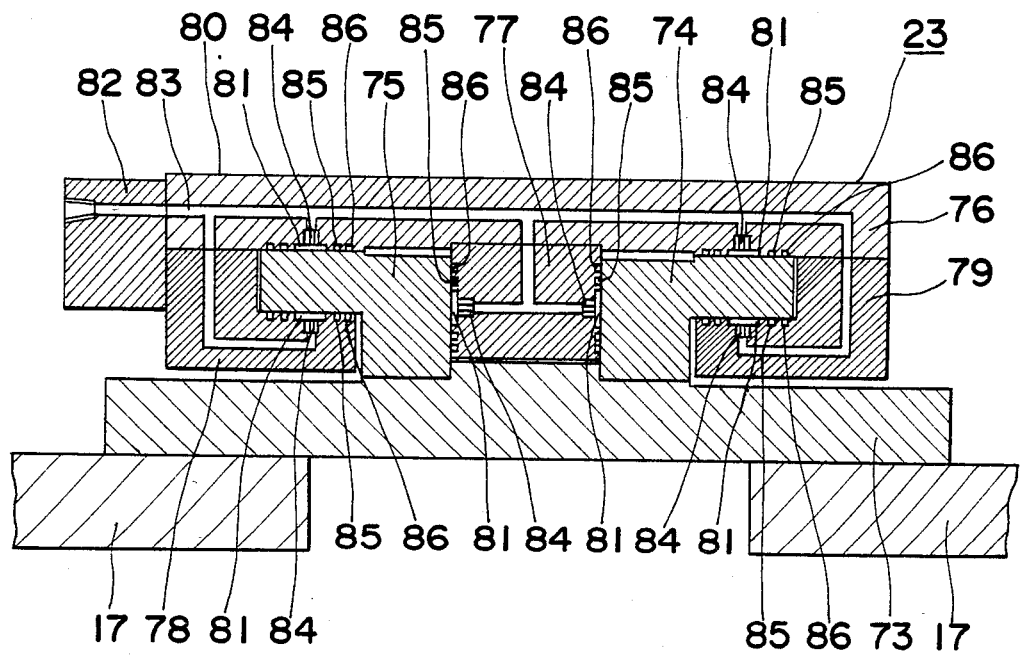
FIG. 10 is a cross-sectional view taken along the line X—X in FIG. 9.

Referring to FIG. 10, the X-axis slide table 23 includes a base plate 73, guide blocks 74 and 75 each having a L-shaped cross section, an upper plate 76, a center block 77 and side blocks 78 and 79 each having a L-shaped cross section. The guide blocks 74 and 75 are secured to the base plate 73 provided on the frame 17. Meanwhile, the center block 77 and side blocks 78 and 79 are mounted on the upper plate 76 at a central portion and positions adjacent to one side and the other side thereof, respectively, so that the guide blocks 74 and 75 may be slidably fitted into a space between the center block 77 and the side block 79 and a space between the center block 77 and the side block 78, respectively, whereby the upper plate 76, center block 77 and side blocks 78 and 79 constitute an X-axis table movable portion 80 slidable along the guide blocks 74 and 75. Pockets 81 are formed on one surface of the upper plate 76 confronting the guide blocks 74 and 75, on one surface of the side block 78 confronting the guide block 75, on one surface of the side block 79 confronting the guide block 74, and on opposite surfaces of the center block 77 confronting the guide blocks 74 and 75, respectively and are, respectively, provided with restrictors 84. Each restrictor 84 is communicated, through a first passage 83, with a manifold 82 provided on the one side of the upper plate 76 and leading to the hydraulic unit 40 and thus, the working fluid is supplied from the hydraulic unit 40 to each of the pockets 81 through the manifold 82, first passage 83 and each of the restrictors 84. The working fluid which has leaked out of the pockets 81 is collected into the hydraulic unit 40 through second passages 85 for collecting the working fluid, which are formed on slideways of the upper plate 76, center block 77 and side blocks 78 and 79. The working fluid which has further leaked out the second passages 85 is collected into the hydraulic unit 40 through third passages 86 which are formed on the slideways of the upper plate 76, center block 77 and side blocks 78 and 79 so as to be disposed further from the pockets 81 than the second passages 85.

Figure 11:
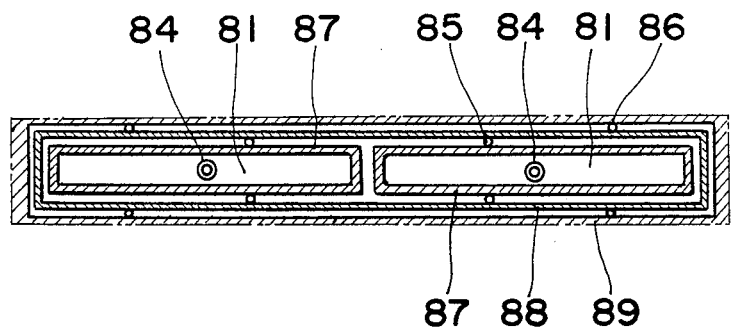
FIG. 11 is a view explanatory of a pattern of a static pressure fluid bearing portion of the slide table unit of FIG. 9.

Referring now to FIG. 11, there is shown a pattern of the pockets 81, second passages 85 and third passages 86 described above. In FIG. 11, hatched portions denote parts higher in level than other parts and are generally referred to as land portions. First land portions 87, a second land portion 88 and a third land portion 89 are provided outside the pockets 81, second passages 85 and third passages 86, respectively. Clearances between the upper plate 76, side blocks 78 and 79 and center block 77 on one hand, and the guide blocks 74 and 75 on the other hand are approximate 10 μm in width at the land portions 87, 88 and 89.

By the above-described arrangement, the X-axis table movable portion 80 is associated with the guide blocks 74 and 75 so as to constitute a static pressure fluid bearing structure. It is to be noted that the Y-axis slide table 24 is substantially the same as the X-axis slide table 23 in the arrangements of the sliding portions.

Figure 12:
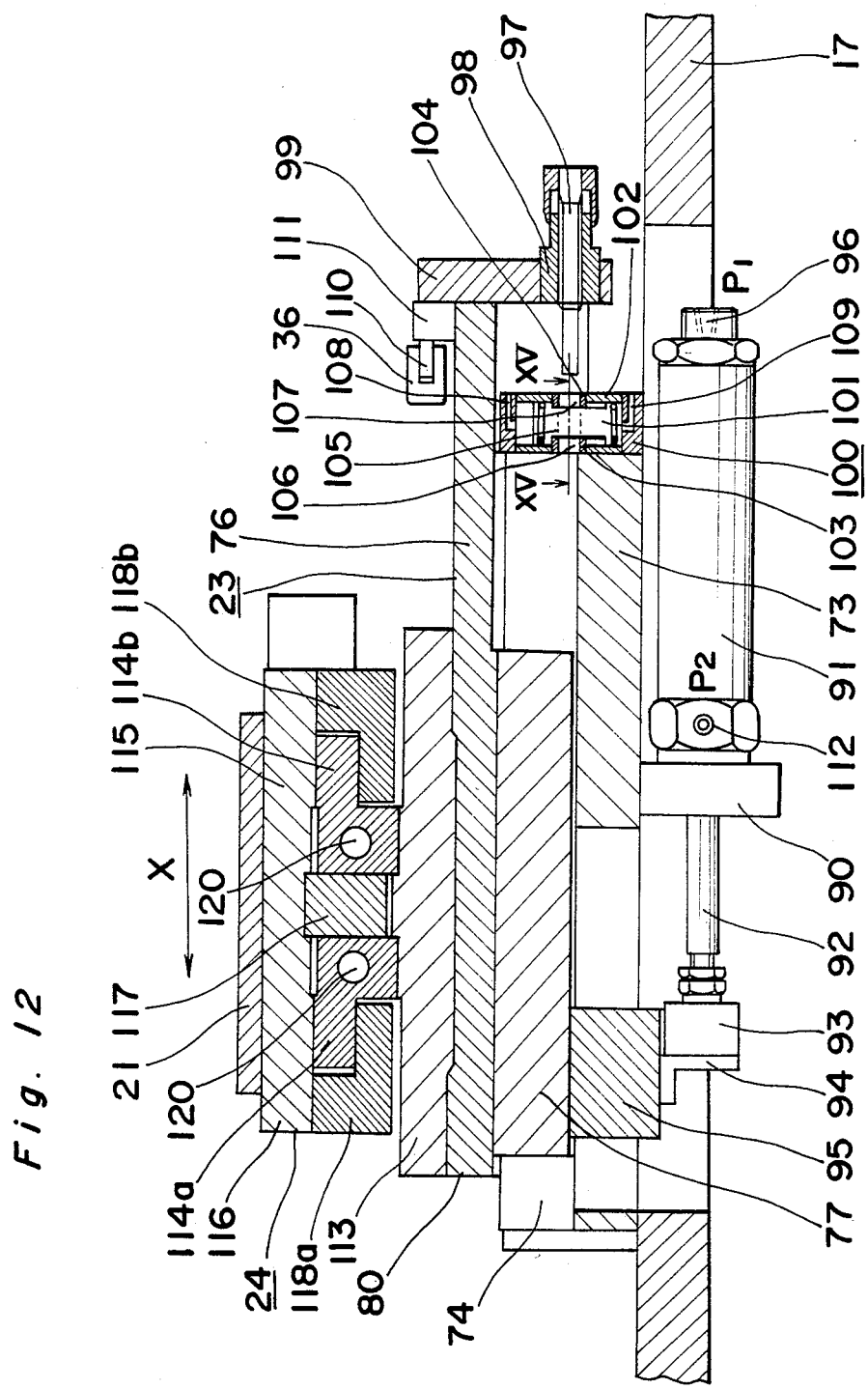
FIG. 12 is a cross-sectional view taken along the line XII—XII in FIG. 9.
Figure 15:
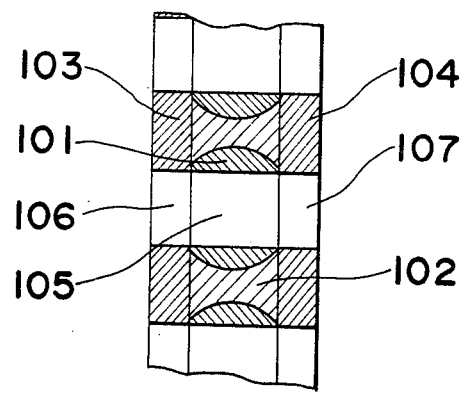
FIG. 15 is a cross-sectional view taken along the line XV—XV in FIG. 12, showing a stopper for the slide table unit of FIG. 9.

Referring to FIG. 12, a pneumatic cylinder 91 having air inlet ports 96 and 112 is mounted on the base plate 73 through a block 90 and one end of a rod 92 of the pneumatic cylinder 91 is secured to the center block 77 through a connector 93, a bracket 94 and a block 95. Since air is usually supplied to the air inlet port 96, the X-axis table movable portion 80 is subjected to a force for causing the X-axis table movable portion 80 to move in the leftward direction in FIG. 12. A stop plate 99 into which five nuts 98 in engagement with corresponding stop screws 97 are press fitted is attached to one end of the upper plate 76. A stopper 100 formed with five stop pistons 101 corresponding to the respective five stop screws 97 is fixed to one end of the guide block 74. The stop piston 101 of a cylindrical configuration has a pair of flat cutout portions which are formed on a cylindrical side face thereof so as to be parallel to each other. As best shown in FIG. 15, the stop pistons 101 are accommodated in a stopper body 102. The stopper 100 further has blocks 103 and 104 which are, respectively, brought into contact with the two flat cutout portions of each of the stop pistons 101 so as to prevent rotation of the stop pistons 101. Each of the stop pistons 101 has a through-hole 105 which is formed on the cutout portions so as to be larger, in diameter, than the stop screw 97. The blocks 103 and 104 have, respectively, five through-holes 106 and five through-holes 107 which are equal, in diameter, to the through-hole 105 such that the through-holes 106 are in alignment with the corresponding through-holes 107. Meanwhile, the stopper 100 has air inlet ports 108 and 109 which are formed at upper and lower portions thereof, respectively. When air is supplied to the air inlet port 108, the stop pistons 101 are caused to move downwardly in FIG. 12 so that the through-holes 105 may be aligned with the corresponding stop screws 97. When the X-axis table movable portion 80 is moved in this state in the leftward direction in FIG. 12, each of the stop screws 97 is fitted into each of the through-holes 105 of the corresponding stop pistons 101 even if each of the stop screws 97 reaches each of the corresponding stop pistons 101, so that the stop screws 97 do not position the X-axis table movable portion 80. However, when air is supplied to the air inlet port 109, the stop pistons 101 are caused to move upwardly in FIG. 12 such that the through-holes 105 are not aligned with the corresponding stop screws 97. Accordingly, when the X-axis table movable portion 80 is moved in this state in the leftward direction in FIG. 12, each of the stop screws 97 is brought into contact with one of the cutout portions of each of the corresponding stop pistons 101, whereby the X-axis table movable portion 80 is positioned.

Furthermore, a block 111 for contact with a roller 110 provided at one end of the lever 36 is mounted on an upper surface of the upper plate 76 so as to be in contact with the stop plate 99. The X-axis table movable portion 80 is usually moved by the use of the lever 36. Air is supplied to the air inlet port 96 of the pneumatic cylinder 91 during movement of the X-axis table movable portion 80 by the use of the lever 36. However, when air is supplied to the air inlet port 112 of the pneumatic cylinder 91, the X-axis movable portion 80 is moved in the rightward direction in FIG. 12 irrespective of movement of the lever 36 so as to be retracted in a direction remote from the spindle unit 6 as shown in FIG. 13.

Figure 13:
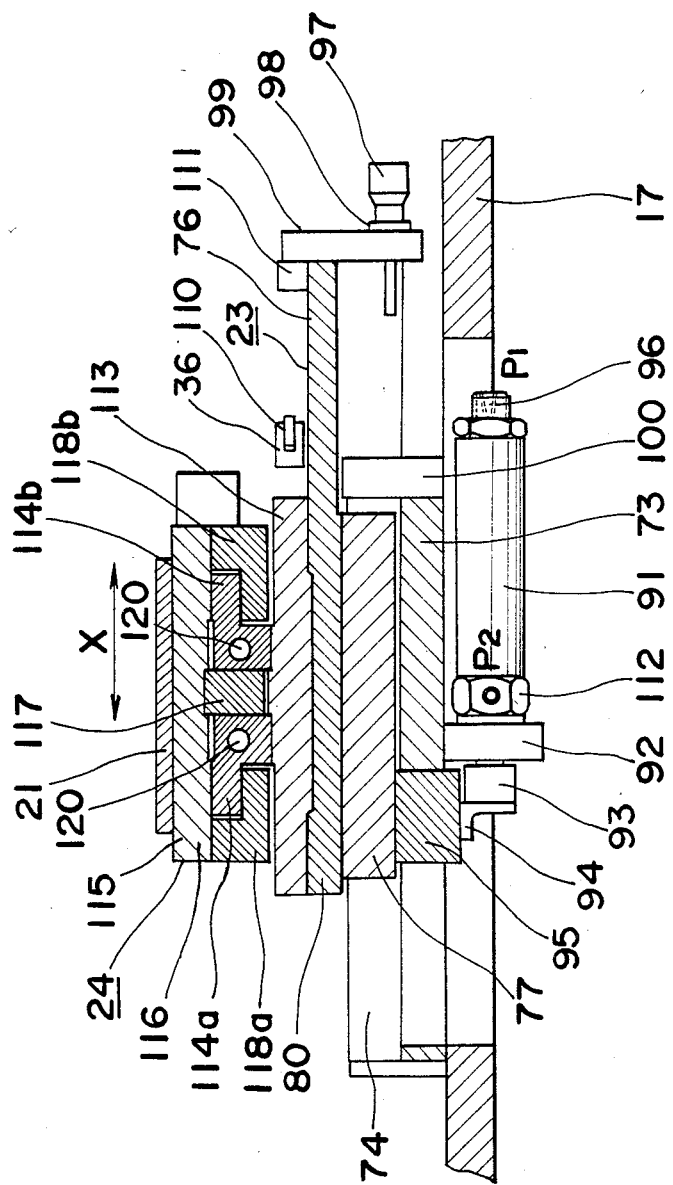
FIG. 13 is a cross-sectional view of the slide table unit of FIG. 9.
Figure 14:
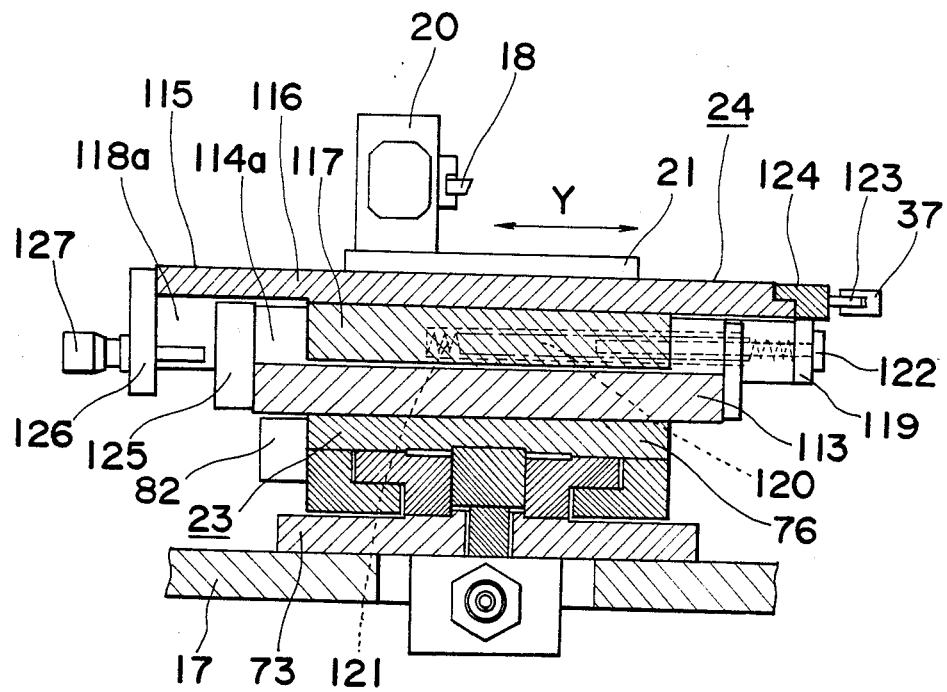
FIG. 14 is a cross-sectional view taken along the line XIV—XIV in FIG. 9.

Referring now to FIGS. 12 to 14, the Y-axis slide table 24 includes a base plate 113, guide blocks 114a and 114b each having a L-shaped cross section, an upper plate 116, a center block 117 and side blocks 118a and 118b each having a L-shaped cross-section. The guide blocks 114a and 114b are secured to the base plate 113 which is mounted on the upper plate 76 of the X-axis slide table 23. On the other hand, the center block 117 and side blocks 118a and 118b are mounted on the upper plate 116 at a central portion and positions adjacent to one side and the other side thereof, respectively so that the guide blocks 114a and 114b may be slidably fitted into a space between the center block 117 and the side block 118a, and a space between the center block 117 and the side block 118b, respectively, whereby the upper plate 116, center block 117 and side blocks 118a and 118b constitute a Y-axis table movable portion 115 slidable along the guide blocks 114a and 114b. As best shown in FIG. 14, a plate 119 is attached to one end of each of the guide blocks 114a and 114b each having an opening 120 extending in a longitudinal direction thereof. Each of compression springs 121 is inserted into each of the openings 120 so as to be disposed between the plate 119 and each of the guide blocks 114a and 114b with each of guide bars 122 acting as a guide of each of the compression springs 121. The Y-axis table movable portion 115 is at all times subjected to a force for causing the Y-axis table movable portion 115 to move in the rightward direction in FIG. 14 by the compression springs 121. Meanwhile, a block 124 for contact with a roller 123 provided at one end of the lever 37 is attached to one end of the upper plate 116. Since a stopper 125, a stop plate 126 and stop screws 127 of the Y-axis slide table 24 are the same, in the functions, as the stopper 100, stop plate 99 and stop screws 97 of the X-axis slide table 23, description thereof is abbreviated for brevity. Furthermore, since other constructions of the Y-axis slide table 24 are similar to those of the X-axis slide table 23, description thereof is abbreviated for brevity.

In this embodiment, since the X-axis table movable portion 80 has a large stroke and the Y-axis slide table movable portion 115 has a small stroke, air cushion by the use of the pneumatic cylinder 91, and the compression springs 121 are, respectively, employed for the X-axis slide table 23 and Y-axis slide table 24. However, the compression springs 121 of the Y-axis slide table 24 can be replaced by air cushion.

Then, the lead machining unit 20 will be described with reference to FIGS. 3 to 5, 9 and 16 to 20, hereinbelow. The lead machining unit 20 includes an upper block 131, a lower block 132, two compression springs 134 and two spring rods 133 for the compression springs 134 with the upper block 131 and lower block 132 being fixed to the tool plate 21. The lead machining unit 20 is provided for machining the work 10 in accordance with the lead cam 8. The spring rod 133 has a male thread portion formed at one end thereof, a head portion formed at the other end thereof and a rod portion formed between the male thread portion and the head portion. The first piston 130 has a trunnion portion formed at one end thereof and a head portion formed at the other end. The first piston 130 further has two female threads formed on one end of the head portion thereof adjacent to the trunnion portion, and a through-hole formed on the trunnion portion thereof and extending at right angles to the axial direction of the first piston 130. Each of the upper block 131 and lower block 132 has a counter-bored through-hole.

The roller 128 is rotatably attached to the trunnion portion of the first piston 130 by fitting a pin 129 into the through-hole of the trunnion portion. The compression springs 134 are, respectively, inserted into the counter-bored through-holes of the upper block 131 and lower block 132 and then, the spring rods 133 are fitted, respectively, through the counter-bored through-holes of the upper block 131 and lower block 132 so that the male thread portion of the spring rod 133 may be screwed into each of the female threads of the head portion of the first piston 130, whereby the compression springs 134 are, respectively, held between the head portion of the spring rod 133 and the counter-bored surface of the counter-bored through-hole of the upper block 131, and between the head portion of the spring rod 133 and the counter-bored surface of the counter-bored through-hole of the lower block 132. The first piston 130 for contact with the lead cam 8 through the roller 128 and pin 129 is slidably fitted into the upper block 131 and lower block 132. Accordingly, the first piston 130 is urged in the leftward direction in FIG. 18 by the compression springs 134 such that the roller 128 is at all times held in contact with the lead cam 8.

Figure 16:
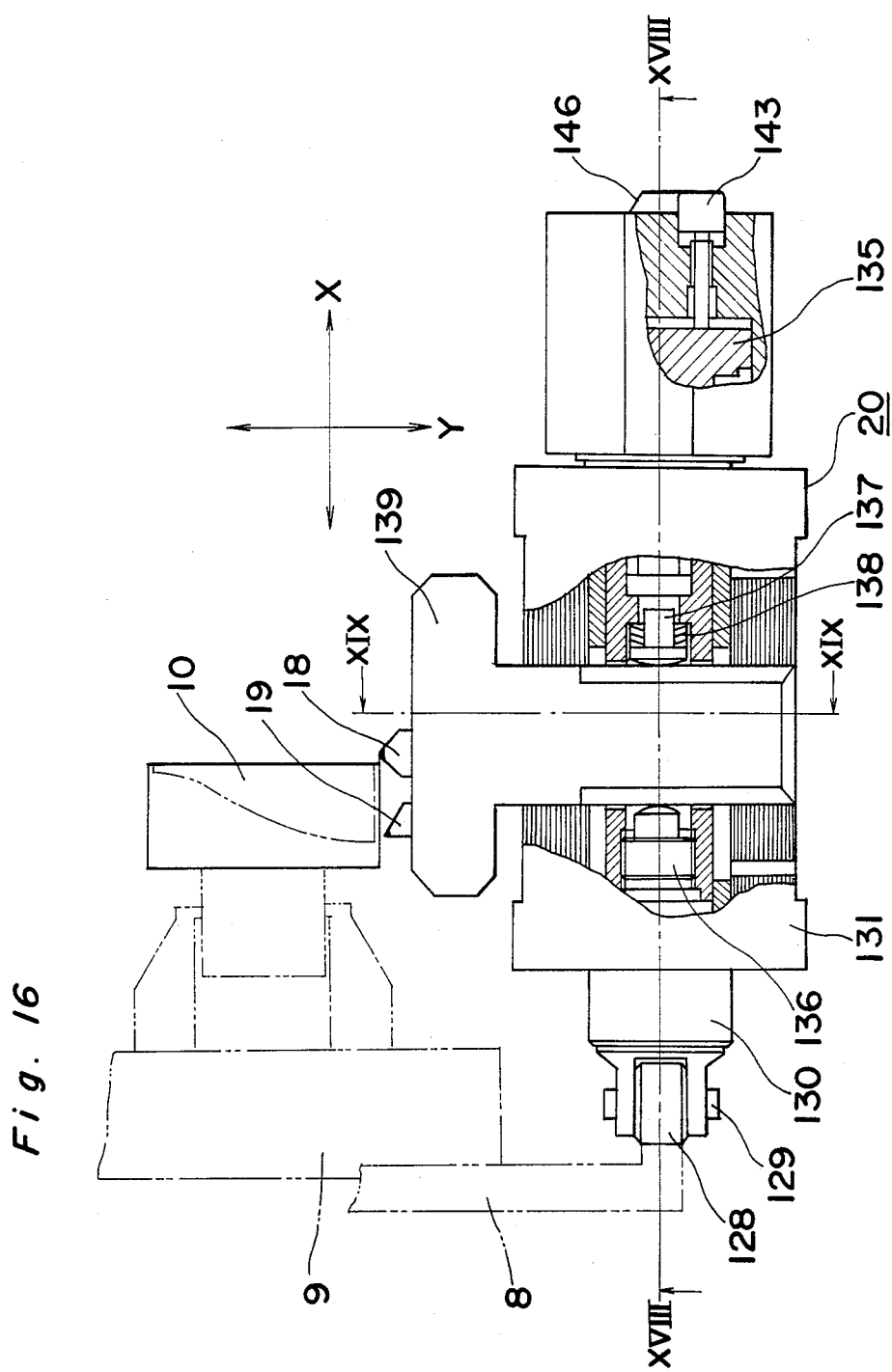
FIG. 16 is an enlarged top plan view partly in section of a lead machining unit employed in the lead face machining apparatus of FIG. 3.
Figure 17:
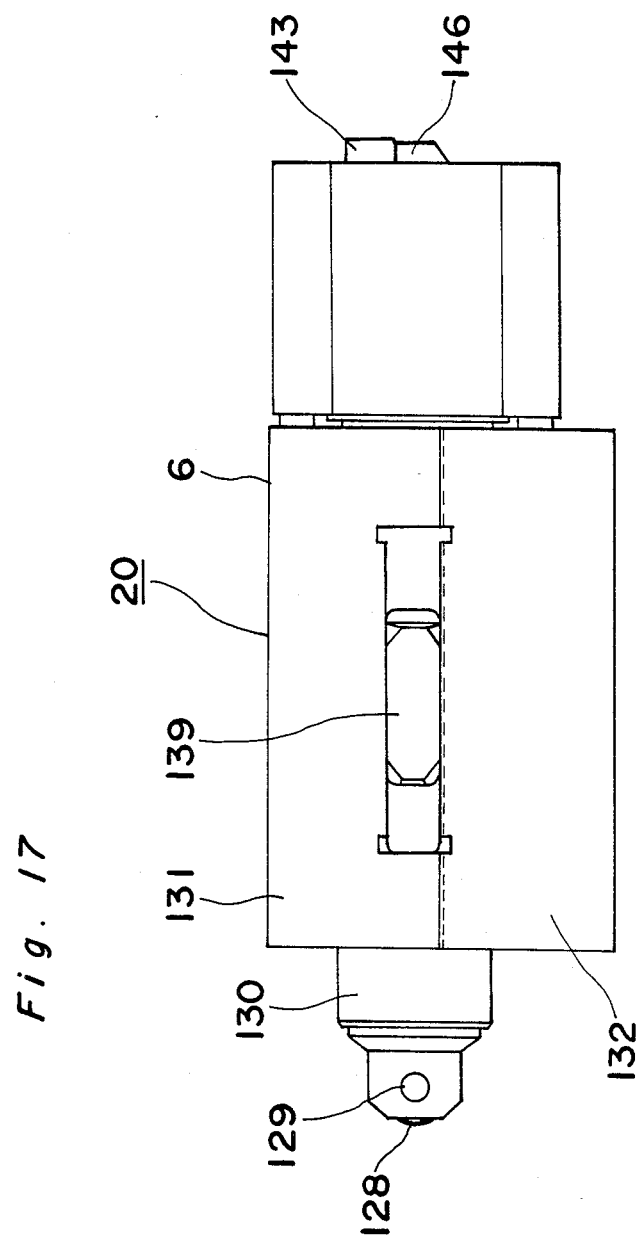
FIG. 17 is a front elevational view of the lead machining unit of FIG. 16.
Figure 18:
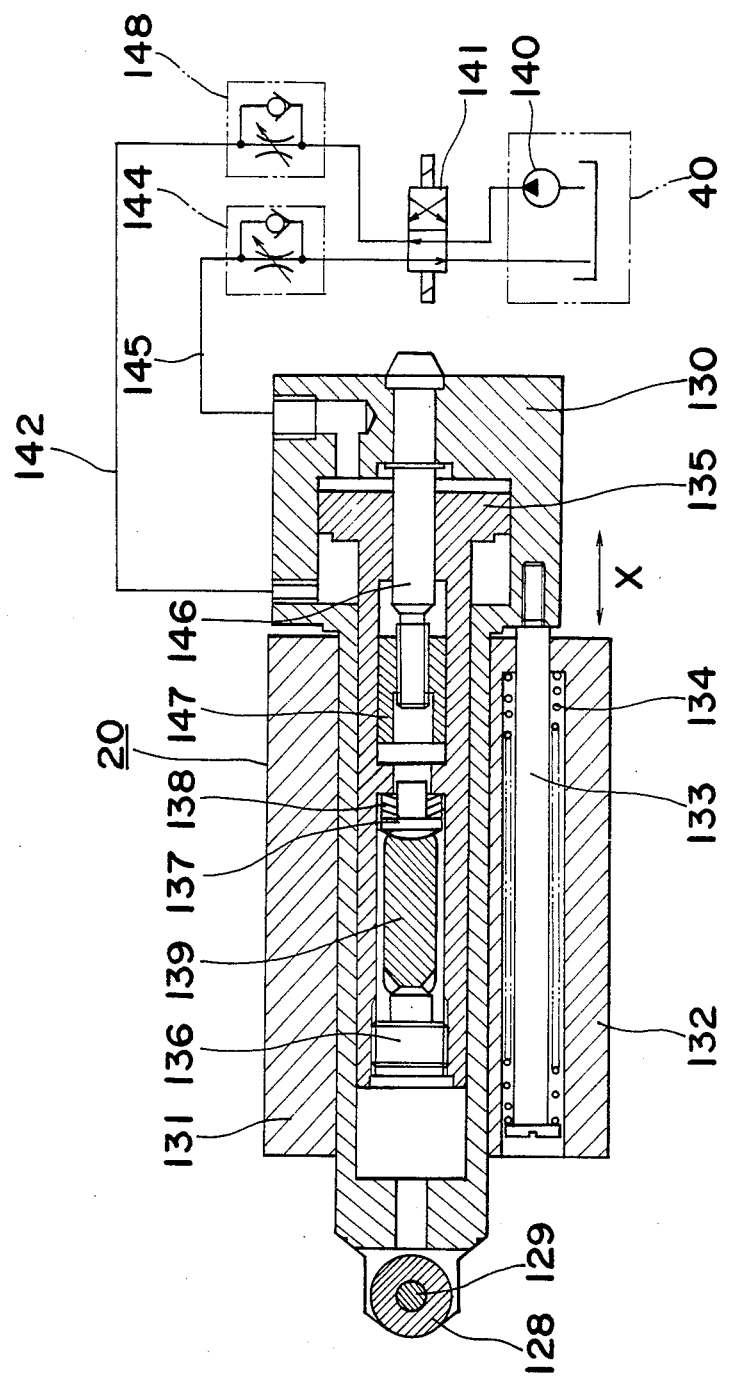
FIG. 18 is a cross-sectional view taken along the line XVIII—XVIII in FIG. 16.
Figure 19:
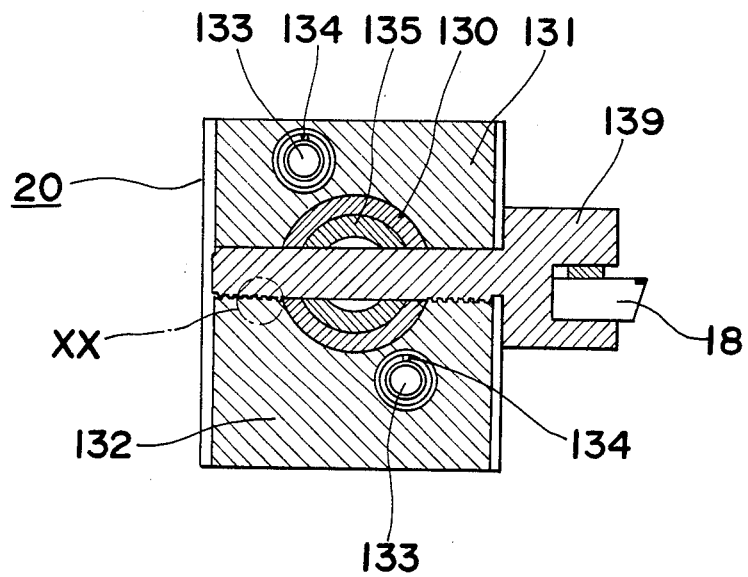
FIG. 19 is a cross-sectional view taken along the line XIX—XIX in FIG. 16.
Figure 20:
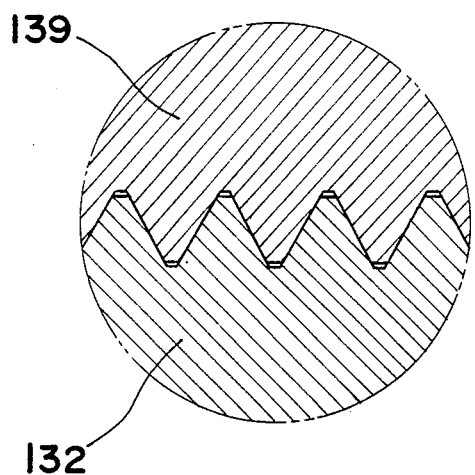
FIG. 20 is a view showing, on an enlarged scale, the portion XX in FIG. 19.

Meanwhile, a second piston 135 is fitted into a bore of the first piston 130 so as to constitute a hydraulic cylinder. The second piston 135 further has a screw 136, a pusher 137, a Belleville spring 138 and a slide block 139 each provided therein. The slide block 139 is interposed between the screw 136 and the pusher 137 which is urged toward the screw 136 by the Belleville spring 138. As shown in FIGS. 19 and 20, the slide block 139 to which the cutting tools 18 and 19 are fixed is slidably engaged with the lower block 132 through serration. As shown in FIG. 18, when the working fluid supplied from a pump 140 of the hydraulic unit 40 is admitted into the first piston 130 through a change-over valve 141 and a passage 142, the second piston 135 is caused to move in the direction remote from the spindle unit 6 relative to the first piston 130 and thus, movement of the second piston 135 is stopped through contact of the second piston 135 by a stop screw 143 which is provided at the other end of the head portion of the first piston 130 remote from the trunnion portion as shown in FIG. 16. It is to be noted that the feed rate of the second piston 135 relative to the first piston 130 at that time is determined by a restrictor 144. In the case where the working fluid is supplied to a passage 145 through change-over of the change-over valve 141, the second piston 135 is caused to move in the direction toward the spindle unit 6 relative to the first piston 130 and thus, movement of the second piston 135 is stopped through contact of the second piston 135 by a stop block 147 which is adjustably positioned by a screw 146 provided in the head portion of the first piston 130. It is to be noted that the feed rate of the second piston 135 relative to the first piston 130 at that time is determined by a restrictor 148.

Figure 21:
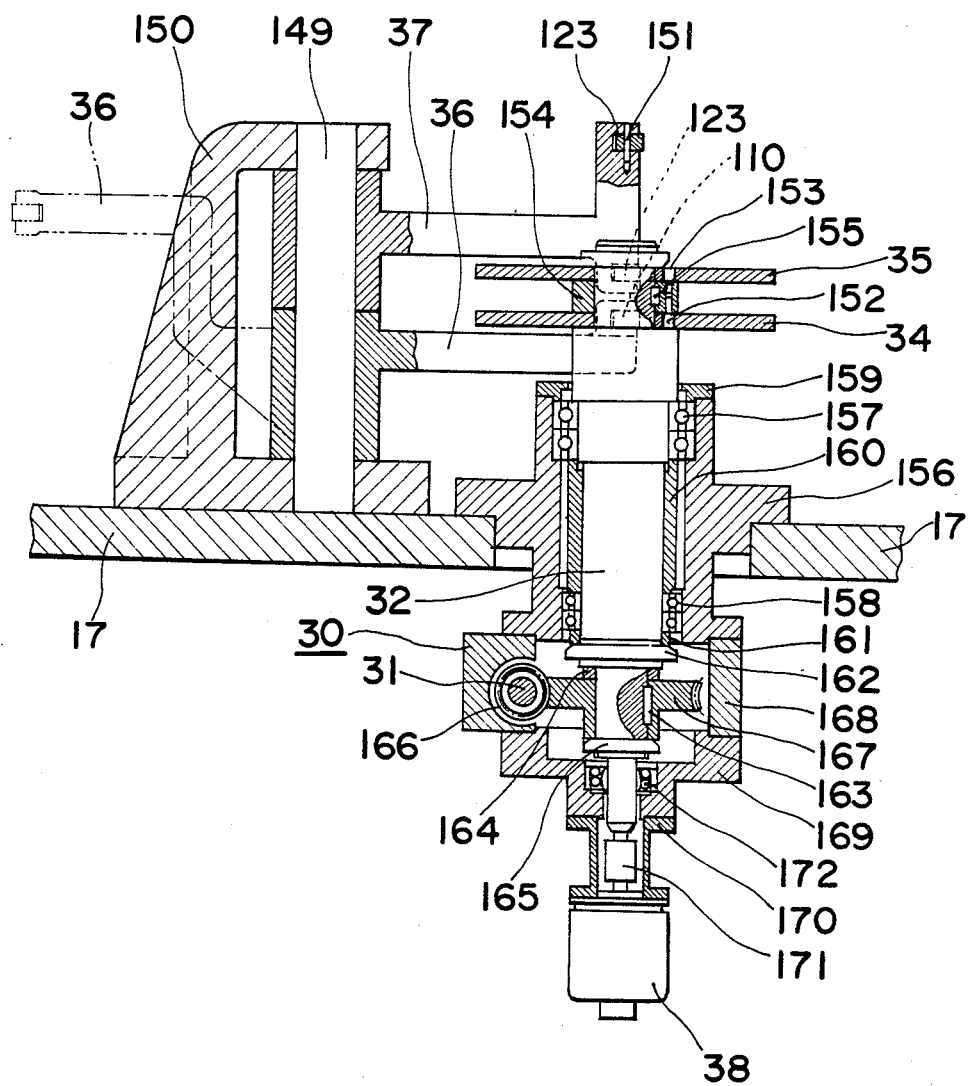
FIG. 21 is an enlarged cross-sectional view taken along the line XXI—XXI in FIG. 3, showing a cam drive unit employed in the lead face machining apparatus of FIG. 3.

Now, a cam drive unit will be described with reference to FIG. 21, hereinbelow. The cam drive unit includes the X-axis cam 34, the Y-axis cam 35 and the cam shaft 32 on which the X-axis cam 34 and Y-axis cam 35 are fixedly mounted. The lever 36 for the X-axis slide table 23 and the lever 37 for the Y-axis slide table 24 are rotatably supported by a lever shaft 149 fitted into a through-hole of a bracket 150 which is mounted on the frame 17. Rollers 110 are rotatably attached to one end and the other end of the lever 36 by pins 151, respectively. Similarly, rollers 123 are rotatably attached to one end and the other end of the lever 37 by pins 151, respectively. The rollers 110, respectively, provided at the one end and the other end of the lever 36, are, respectively, held in contact with the block 111 of the X-axis slide table 23 and the X-axis cam 34. Likewise, the rollers 123, respectively, provided at the one end and the other end of the lever 37 are, respectively, held in contact with the block 124 of the Y-axis slide table 24 and the Y-axis cam 35. The X-axis cam 34 and Y-axis cam 35 are coupled with a collar 154 by pins 152 and 153, respectively, which coller 154 is coupled with the cam shaft 32 by a key 155. The cam shaft 32 is mounted, through bearings 157 and 158 fitted into a bearing holder 156, on the bearing holder 156 which is secured to the frame 17. A ring 159, spacers 160 and 161 and a nut 162 are provided for securing the bearings 157 and 158 to the cam shaft 32 and bearing holder 156. Ihe cam shaft 32 is further provided with a worm wheel 167 to be engaged with a worm 166 through a key 163, a spacer 164 and a nut 165. The encoder 38 is attached to the bearing holder 156 through a reduction gear casing 168 of the reduction gear 30, and brackets 169 and 170 and is coupled with the cam shaft 32 by a connector 171, whereby rotational positions of the cam shaft 32 are detected by the encoder 38. It should be noted that a bearing 172 disposed at an end portion of the cam shaft 32 adjacent to the encoder 38 is provided for minimizing run-out of the cam shaft 32. A shaft formed with the worm 166 shown in FIG. 21 is the input shaft 31 shown in FIG. 5, which is rotated by the cam shaft motor 25. When the cam shaft motor 25 is rotated, rotational force of the cam shaft motor 25 is transmitted to the input shaft 31 through the pulley 27, timing belt 28 and pulley 29, so that the worm 166 is rotated and thus, the X-axis cam 34 and Y-axis cam 35 are rotated together with the worm wheel 167 and cam shaft 33, whereby the X-axis slide table 23 is driven by the lever 36 through the roller 110 in contact with the X-aixs cam 34 while the Y-axis slide table 24 is driven by the lever 37 through the roller 123 in contact with the Y-axis cam 35.

Figure 22:
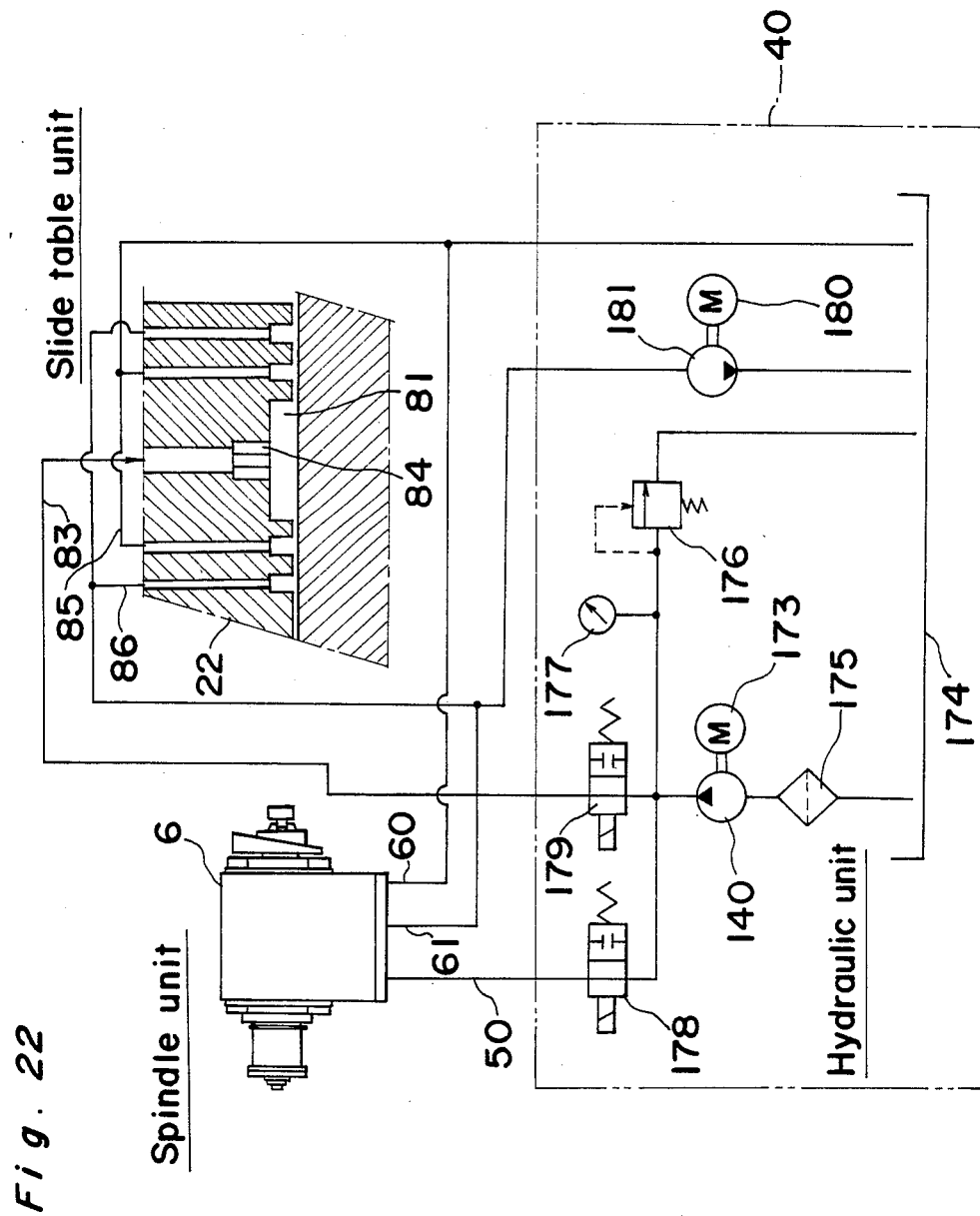
FIG. 22 is a hydraulic circuit diagram of the lead face machining apparatus of FIG. 3.

Hereinbelow, a hydraulic circuit of the hydraulic unit 40 for supplying the working fluid to static pressure fluid bearing portions of the spindle unit 6 and slide table unit 22 will be described with respect to FIG. 22. The working fluid which has been drawn up from a tank 174 by the pump 140 to be driven by a motor 173 is pressurized by the pump 140 through a filter 175. As shown in FIG. 22, the tank 174 is open to the atmosphere and thus is at atmospheric pressure. A relief valve 176 is provided for maintaining pressure of the working fluid constant and the pressure of the working fluid is indicated by a pressure gauge 177. The working fluid discharged from the pump 140 flows through the change-over valves 178 and 179 into the spindle unit 6 and slide table unit 22, respectively.

The working fluid discharged from the change-over valve 178 flows, through the restrictors 55a to 55d, 56a to 56d, 59 and 59′, into the pockets 50a to 50d, 51a to 51d, 57 and 58, respectively. The working fluid which has leaked out of the pockets 50a to 50d, 51a to 51d, 57 and 58 through clearances between the spindle 7 and the radial/thrust bush 43, between the spindle 7 and the radial bush 44, between the flange 45 and the radial/thrust bush 43, and between the flange 45 and the thrust bush 49, respectively is collected into the tank 174 through the second passages 60. The working fluid which has further leaked out of the second passages 60 is collected into the tank 174 through the third passages 61.

On the other hand, the working fluid discharged from the change-over valve 179 flows, through the first passage 83 and restrictor 84, into the pocket 81. Most of the working fluid which has leaked out of the pocket 81 is collected into the tank 174 through the second passage 85. The working fluid which has further leaked out of the second passage 85 is collected into the tank 174 through the third passage 86. Since the third passage 86 is connected with a pump 181 to be driven by a motor 180, the working fluid in the third passage 86 is forcedly drawn up by the pump 181 so as to be collected into the tank 174.

Generally, apparatuses having a slide mechanism of a static pressure fluid bearing structure have such a disadvantage that the working fluid tends to leak out of the apparatuses and thus, it becomes necessary to make the apparatuses large in size. However, in this embodiment, since the third passage 86 is provided with the pump 181 for suction, the working fluid does not leak out of the apparatus K and the slide table unit can be made compact in size.

Figure 1:
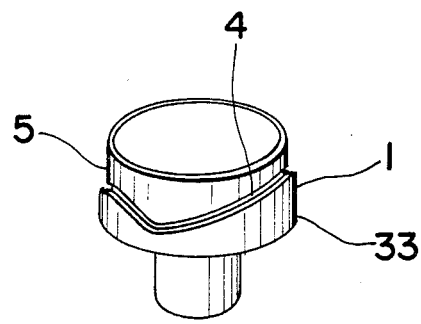
FIG. 1 is a perspective view of a component having a lead face on its cylindrical surface.
Figure 2:
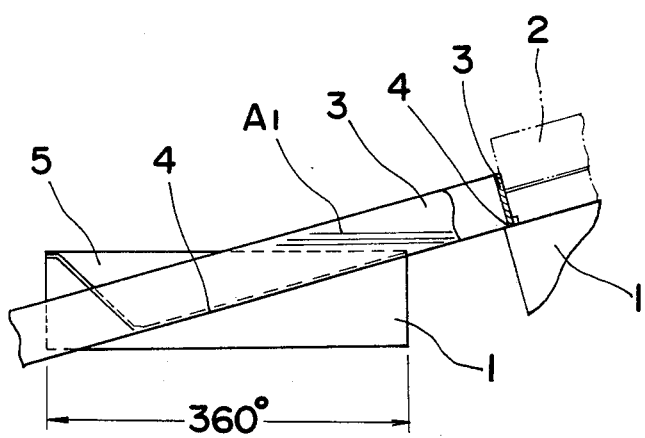
FIG. 2 is a development view of a fixed cylinder of a video tape recorder.

By the above-described arrangements of the lead face machining apparatus K, the work 10 is machined to the component having such a lead curve as shown in FIG. 1 as follows. The work 10 is gripped by the chuck 9 which is secured to the spindle 7 together with the lead cam 8. Then, the lead machining unit 20 is positioned by the X-axis cam 34 and Y-axis cam 35 so as to be fixed at a position such that the roller 128 is brought into contact with the lead cam 8 with the cutting tool 18 being disposed more adjacent to the rotational axis of the work 10 than the cutting tool 19. Meanwhile, at this time, the working fluid is supplied to the first piston 130 through the passage 142 (FIG. 18) and thus, the second piston 135 is moved in the rightward direction in FIG. 16 until the second piston 135 is brought into contact with the stop screw 143.

When the spindle 7 is rotated in this state, the work 10, chuck 9 and lead cam 8 are rotated, so that the first piston 130 in contact with the lead cam 8 through the roller 128 is reciprocated and thus, and cutting tools 18 and 19 attached to the slide block 139 is reciprocated. Then, when the slide table unit 22 is moved in the upward direction in FIG. 16 so as to provide a depth of cut for the cutting tool 18 and the working fluid is admitted into the passage 145 (FIG. 18), the cutting tool 18 is moved in the leftward direction relative to the first piston 130 while being reciprocated together with the first piston 130 with movement of the cutting tool 18 relative to the first piston 130 being determined by the restrictor 148, whereby the cylindrical surface 5 of the component shown in FIG. 1 can be machined.

When the second piston 135 is moved in the leftward direction in FIG. 16 relative to the first piston 130 and movement of the second piston 135 is stopped through contact of the second piston 135 by the stop block 147, the slide table unit 22 is moved in the downward direction in FIG. 16 so as to space the cutting tool 18 from the work 10 and the working fluid is introduced into the passage 142 through change-over of the change-over valve 141. Thus, the second piston 135 is moved in the rightward direction in FIG. 16 and movement of the second piston 135 is stopped through contact of the second piston 135 by the stop screw 143 and thus, the cutting tool 19 is positioned at the lead face 4. Thereafter, the slide table unit 22 is moved in the upward direction in FIG. 16, whereby the lead face 4 of the component shown in FIG. 1 is machined.

In accordance with the present invention, since each of the spindle unit and the two slide tables having the lead machining unit placed thereon has a static pressure fluid bearing structure, the work is least subjected to vibration produced through contact of the lead cam by the lead machining unit, thus resulting in higher accuracy in machining.

What is claimed is:
1. A lead face machinine apparatus comprising:
a spindle unit which has a workpiece rotatably mounted thereon and includes a housing and a spindle rotatably supported by said housing;
said housing having a static pressure fluid bearing formed between said spindle and said housing;
an end cam which is provided rotatably together with said spindle;
a first slide table which includes a first guide member extending in an axial direction of said spindle unit, and a first table provided slidably along said first guide member;
said first table having a first static pressure fluid bearing consisting of a first passage for introducing fluid between said first guide member and said first table, a plurality of return passages for returning said fluid to a pressure generating unit so as to constitute a first static pressure fluid bearing between said first table and said first guide member, and additional return passages for returning said fluid to said pressure generating unit spaced further from said first passage than said plurality of return passages;
a second slide table which includes a second guide member extending substantially at right angles to the axial direction of said spindle unit, and a second table provided slidably along said second guide member;
said second table having a second static pressure fluid bearing consisting of a second passage for introducing the fluid between said second guide member and said second table, a plurality of return passages for returning the fluid to said pressure generating unit so as to constitute a second static pressure fluid bearing between said second table and said second guide member, and additional return passages for returning said fluid to said pressure generating unit spaced further from said first passage than said plurality of return passages;
means for moving said first slide table and means for moving said second slide table in a direction substantially perpendicular to the direction of movement of said first slide table, one of said tables being provided on the other of said tables;
a lead machining unit which is placed on one of said tables so as to be brought into contact with said end cam and includes a cutting tool;
said cutting tool being caused to slide in the axial direction of said spindle unit upon rotation of said end cam so as to machine said workpiece mounted on said spindle unit;

fluid supplying means for supplying fluid to said static pressure fluid bearing, said first static pressure fluid bearing and said second static pressure fluid bearing in common; and means for withdrawing fluid from said additional return passages.

2. The lead face machining apparatus of claim 1, wherein said housing contains bush means for supporting said spindle and said static pressure fluid bearing formed between said spindle and said housing comprises:

passages means for introducing fluid between said bush means and said spindle, a plurality of return passages for returning said fluid to a pressure generating unit so as to constitute a static pressure fluid bearing between said spindle and said housing, additional return passages for returning said fluid to said pressure generating unit spaced further from said passage means than said plurality of return passages, and means for withdrawing fluid from said additional return passages.

3. A lead face machining apparatus, comprising:

a spindle unit adapted to rotatably mount a workpiece thereon, said spindle unit including a spindle, a housing circumferentially disposed around said spindle and a static pressure fluid bearing framed between said spindle and said housing, said static fluid bearing including a bush, a first circumferential passage for introducing fluid under pressure into a space between said housing and said bush, a fluid pocket formed between said spindle and said bush and a radial passage extending between said circumferential first passage and said fluid pocket;

means for imparting rotary motion to one end of said spindle;

a plurality of keys formed of an elastic material operably connecting said collar and said spindle;

an end cam located on an end of said spindle;

a first horizontal slide table which includes a first pair of guide blocks extending in the same direction as the axial direction of said spindle, said guide blocks having opposing vertical surfaces and coplanar horizontal surfaces and a first table provided slidably along said horizontal and opposing surfaces of said guide blocks, said first table having a first static pressure fluid bearing consisting of a first passage for introducing fluid in a pocket to each of said opposing vertical surfaces and each of said coplanar horizontal surfaces, a plurality of return passages for returning fluid from each of said surfaces to a fluid pressure generating unit so as to constitute a first static pressure fluid bearing between said first table and said guide blocks and additional return passages for returning the fluid to said pressure generating unit spaced further from said first passage than said plurality of return passages;

a second horizontal slide table which includes a second pair of guide blocks extending substantially at right angles to the axial direction of said spindle unit, said guide blocks having opposing vertical surfaces and coplanar horizontal surfaces and a second table provided slidably along said horizontal and opposing surfaces of said guide blocks, said second table having a second static pressure fluid bearing consisting of a second passage for introducing fluid in a pocket to each of said opposing vertical surfaces and to each of said coplanar horizontal surfaces, a plurality of return passages formed around each of said pockets for returning fluid from each of said surfaces to a fluid pressure generating unit and land portions formed between adjacent pockets and return passages so as to constitute a second static pressure fluid bearing between said second table and said guide blocks and additional return means for returning the fluid to said pressure generating unit spaced further from said second passage than said plurality of return passages, one of said tables being placed on the other of said tables;

means for moving said first slide table and means for moving said second slide table in a direction substantially perpendicular to the direction of movement of said first slide table;

a lead machine unit including a cutting tool placed on one of said tables so that it can be brought into contact with said end cam, said cutting tool being caused to slide in the axial direction of said spindle unit upon rotation of said end cam so as to machine a workpiece mounted on said spindle unit;

fluid supplying means for supplying fluid to said static pressure fluid bearing, said first static pressure fluid bearing and said second static pressure fluid bearing in common; and means for withdrawing fluid from said additional return passages.

4. The machine of claim 3, which contains a first set of resilient keys which operably connect said spindle to a ring around said spindle and a second set of resilient keys which operably connect said ring to said collar.

* * * * *